UNITED STATES PATENT OFFICE.

JAMES D. SIMMONS, OF HAGERSTOWN, MARYLAND.

FERTILIZING COMPOSITION.

SPECIFICATION forming part of Letters Patent No. 484,679, dated October 18, 1892.

Application filed December 19, 1891. Serial No. 415,622. (No specimens.)

*To all whom it may concern:*

Be it known that I, JAMES D. SIMMONS, a citizen of the United States, residing at Hagerstown, in the county of Washington and State of Maryland, have invented certain new and useful Improvements in Fertilizers; and I do hereby declare the following to be a full, clear, and exact description of the invention, such as will enable others skilled in the art to which it appertains to make and use the same.

My invention has relation to novel improvements in fertilizers; and it consists in the novel combination of ingredients stated below and thoroughly mixing the same before the fertilizer is used.

The fertilizer consists of the following ingredients, all combined in or about the proportions stated; but I do not desire to confine myself to the proportions, as the same can be varied without departing from my invention.

I use in my novel fertilizer sulphuret of iron, two hundred pounds; sulphate of potash, two hundred pounds; wood-ashes, six hundred pounds; phosphate of lime, one thousand pounds.

The above ingredients are mixed together in any suitable manner, so that they are thoroughly intermingled in one common mass. The compound is then applied to a plant by means of a hoe or drilled into the ground by a fertilizer-distributer or harrowed into the ground after having been thrown upon the ground by a shovel or otherwise.

The above composition when used upon fruit-trees, vines, or plants produces health and growth and gives fine flavor to the fruit, as well as protecting the fruit from rot, fungus, and parasites, and said fertilizer is inexpensive and easily and quickly applied.

What I claim, and desire to secure by Letters Patent, is—

The fertilizer herein described, consisting of sulphuret of iron, sulphate of potash, wood-ashes, and phosphate of lime, the whole combined in the proportions and for the purpose set forth.

In testimony whereof I affix my signature in presence of two witnesses.

JAMES D. SIMMONS.

Witnesses:
ABNER BARNHART,
JACOB W. MILLER.